Figure 1:
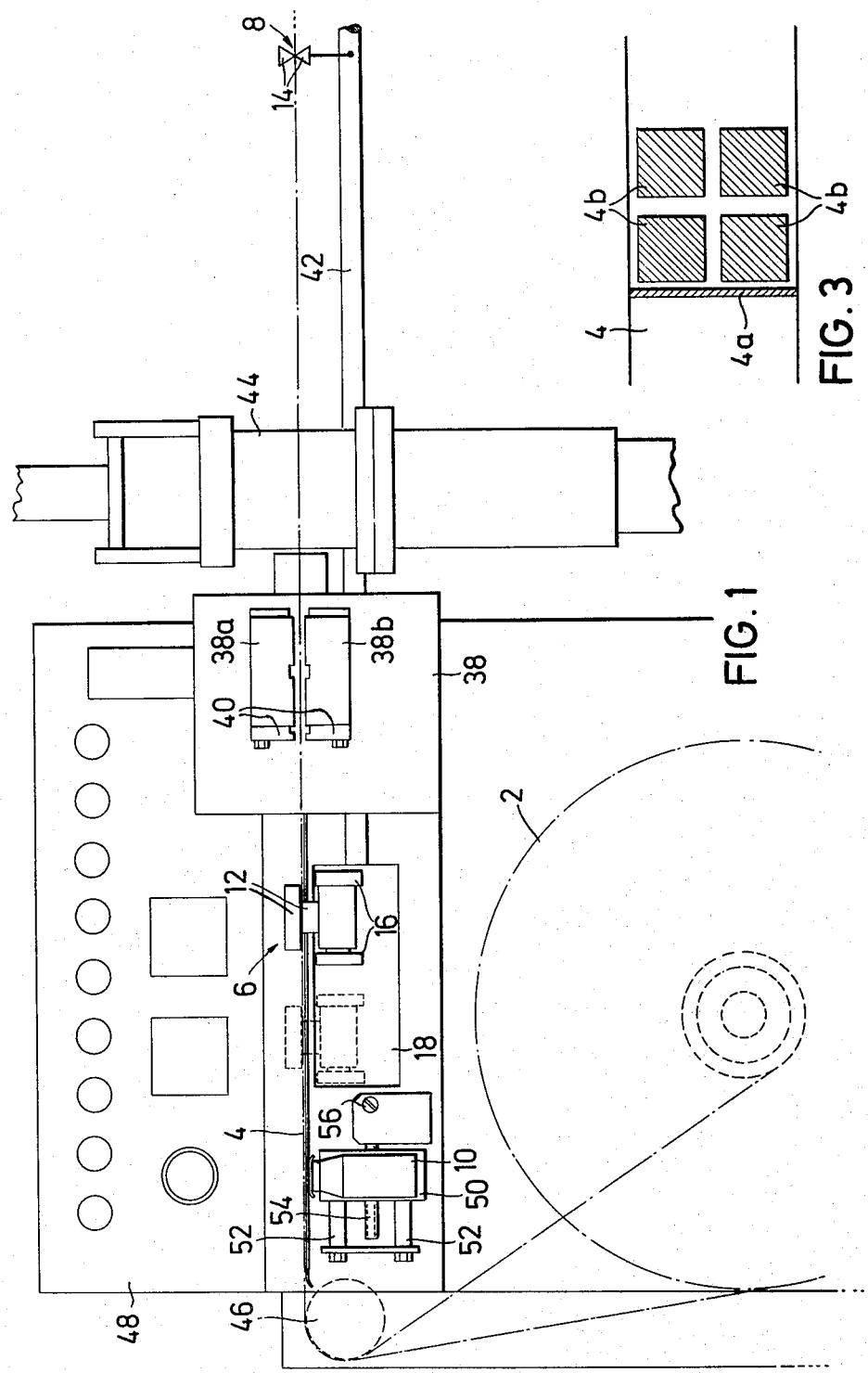

United States Patent [19]
Donnet

[11] 3,908,331

[45] Sept. 30, 1975

[54] WEB REGISTRATION METHOD AND APPARATUS

[75] Inventor: Henry Donnet, Falaise, France

[73] Assignee: Ste. d'Application Plastique Mecanique et Electronique Plastimecanique, Courbevoie, France

[22] Filed: Nov. 6, 1973

[21] Appl. No.: 413,191

[30] Foreign Application Priority Data
Nov. 9, 1972 Germany.............................. 2254715

[52] U.S. Cl. ............................. 53/3; 53/51; 226/2; 226/27
[51] Int. Cl.² .................... B65B 41/18; B65B 47/00
[58] Field of Search ........ 53/51; 156/160, 229, 494, 156/495; 226/2, 27, 32, 158; 250/548, 571

[56] References Cited
UNITED STATES PATENTS

| | | |
|---|---|---|
| 3,126,431 | 3/1964 | Harder et al....................... 53/51 X |
| 3,267,639 | 8/1966 | Ollier et al............................. 53/51 |
| 3,294,301 | 12/1966 | Richter................................ 226/27 |
| 3,762,125 | 10/1973 | Prena..................................... 53/51 |

FOREIGN PATENTS OR APPLICATIONS

| | | | |
|---|---|---|---|
| 816,184 | 7/1959 | United Kingdom..................... 226/2 |

Primary Examiner—Robert L. Spruill
Attorney, Agent, or Firm—Parmelee, Miller, Welsh & Kratz

[57] ABSTRACT

In a packaging apparatus and process wherein a web of thermoplastic film having spaced repeat indicia printed thereon is formed into containers, improved means is provided for centering said indicia when it has deviated by a predetermined amount, said means comprising clamping the film between two horizontally spaced clamping members and longitudinally displacing one of said clamping members with respect to the other thereby stretching the film to compensate for the said predetermined deviation thus centering the indicia printed thereon.

8 Claims, 3 Drawing Figures

WEB REGISTRATION METHOD AND APPARATUS

The present invention concerns a method of and apparatus for automatically centering printed pictures and for use in machines for processing thermoplastic material in roll form, in which machines the film material is centered, heated and processed in web form.

Various mechanisms for automatically centering printed pictures are known which, with the aid of generally known means, compensate deviations that may occur in a portion of a printed picture. These mechanisms operate on the principle of probing printed pictures i.e. marks, notches or the like by suitable means, and of adjusting accordingly the feed of the conveyor systems for the roll material.

In particular a method is known in which the film material, the pictures on which are printed at somewhat shorter distances apart than in the finished condition of the film, is moved over a constant distance per unit of time by a conveyor system which is disposed downstream of the heated zone of the film material in the direction of feed, and onward movement, adjusted with the aid of a device for probing the printed pictures, is imparted to the film material by a conveyor system which is disposed upstream of the heated zone of the material and which always advances the material over shorter steps than does the conveyor system downstream of the heated zone, the film material being stretched between the two conveyor systems.

A disadvantage in this known method is that the film is stretched during its advance between the two conveyor systems, the degree of stretching being adjusted by means of a device for probing the printed pictures which is positioned upstream of the zone where stretching occurs. In other words, although, in the known method, there is a coupling of a mechanical kind between the movement of the first conveyor system and that of the second, this coupling must however be so designed that during the feed, controlled by the device for probing the printed pictures, the speed of the conveyor system disposed upstream of the heated zone of the film material can be reduced to a level below that of the conveyor system downstream of the heated zone. In practice therefore, this method can be used only in combination with conveyor system in the form of rollers, since these are the only means which, while being of reasonably simple design, are capable of providing an infinitely variable drive in the conveyor system disposed upstream of the heated zone of the film material.

It is obvious that the cost of, and constructional complications involved in carrying out this known method are very considerable and therefore result in machines which are too expensive and/or lead to the necessity of dispensing with printed decorative material on the containers formed from the roll of thermoplastic material. Furthermore, in the case of these machines the conveyor rollers must have teeth at their ends and the teeth must engage in complementary perforations at the edge of the film material in order to ensure precise positioning of the film during its movement. This however results in a large loss of film material when blanking the containers, since the perforated edge must be removed from them.

In accordance with a known proposal a variable drive is not used, but instead, use is made of conveyor rollers, driven intermittently by a control mechanism, and there are arranged, between the control mechanism and the intermittently driven rollers, two non-adjustable drives each having a uniform transmission ratio which differs slightly from that of the other, which drives, selectively controlled by a device for probing the printed pictures, establish the connection between the control mechanism and the rollers by means of clutches which are actuated when the rollers are stopped, these drives being used for the conveyor systems disposed upstream of the heated zone in the direction of feed. This proposal likewise does not greatly simplify the design of such apparatus for centering printed pictures and does not therefore provide a technical advance.

The object of the present invention is to provide a method of and an apparatus for automatically centering printed pictures and for use in machines which process thermoplastic material which is initially in the form of rolls and which, after the centering operation, is processed in web form, the film material being intended to be passed to the various processing stations with the printed pictures accurately positioned. In other words, the necessary steps additional to that of centering the printed pictures should not result in the film material deviating increasingly from the required position while it is being processed. The intention is to avoid disadvantages of the known methods and apparatuses for automatically centering the printed pictures, in that the above-mentioned positionally precise processing is acieved by means of a simplified breakdown of the steps of the method which in turn greatly simplifies the construction of the apparatus for automatically centering printed pictures.

According to the invention this object is achieved by the film material being moved in phase and over the same distance by a conveyor system disposed upstream of the heated zone of the material in the direction of feed and by a further conveyor system disposed downstream of said zone, and, for the purpose of centering the printed pictures, by adapting the first conveyor system to be displaceable in a controlled manner relatively to the second conveyor system and in a direction opposite to the direction of feed, with the aid of a device for probing the printed pictures, the film material thus being stretched between the two conveyor systems.

Since the two conveyor systems are moved in phase and over the same distance, they can be powered by the same drive means, and a mechanical connection in the form of gear wheels, chains or thrust rods can be provided between them. According to the invention, the control operation for achieving automatic centering of the printed pictures is simply achieved by adapting the first conveyor system to be displaceable in a controlled manner in relation to the second control system, with the aid of a device for probing the printed pictures, and by thus effecting stretching of the material. There is therefore no need to use expensive drives with variable transmission ratios or a plurality of drives which have slightly differing transmission ratios and which can be selectively coupled to the conveyor rollers. Instead the first conveyor system is designed to be slightly displaceable and is moved rearwardly to the extent of the required amount of stretch by, for example, a hydraulic or pneumatic piston-and-cylinder unit controlled by the device for probing the printed pictures, so that considerable simplification of the working cycle and of the machine elements required therefore is effected.

If the film material is moved by the conveyor systems on a timed basis, then according to the invention it is preferred to cause the controlled backward movement of the first conveyor system to take place after completion of the feed movement and with the film material stopped, the distance of backward travel being constant and the backward movement being initiated after a predetermined amount of deviation has been detected by the device for probing the printed pictures.

The advantage of this further form of the method in accordance with the invention resides in the fact that the degree of deviation in the distances between the printed pictures in relation to the feed of the machine is completely immaterial in the automatic centering of the printed pictures by the method of the invention.

It will be understood that, given the above-mentioned condition, pictures are printed on film material at somewhat shorter distances apart as compared with those on the film in the finished condition. In this case the backward movement of the first conveyor system is always initiated only when the device for probing the printed pictures has detected a predetermined amount of deviation, the backward movement then initiated taking place over a constant distance, but occurring in dependence of the changes in the deviations during the course of the passage of the film material through the machine, and after one or two strokes of the machine or however only after 10 or 15 strokes of the machine.

In order to limit stretching to a controlled predetermined zone of the film material and in particular to prevent stretching from occurring in the parts heated for processing, a further form of the method of the invention provides for the heating of the film material between the two conveyor systems along a narrow band over the entire width, this band lying outside those portions of the film material that are to be heated for processing purposes, and stretching of the film material occurring in the zone of this heated band.

The apparatus for carrying out the method of the invention is characterized in that the conveyor systems consist of clamping devices which are actuated on a timed basis and the supporting elements of which are intimately interconnected and are moved by a common drive means, and in that the first clamping device is mounted on its supporting element for longitudinal displacement, there being provided on the supporting element an actuating element for the backward movement, controlled by means of the device for probing the printed pictures, and adjustable stops for limiting the backward travel.

The proposed designing of the conveyor systems as clamping devices which are actuated on a time basis and are moved by a common drive means, the first clamping device being mounted for longitudinal displacement on its supporting element, results in the conveyor systems always being moved in phase and over the same distance, without the need for special synchronizing and transmission means of the kind comprising chain or gear-wheel drives, while the stretching of the film material by displacement of one of the conveyor systems on its associated supporting element is achieved without it being necessary for this task to be performed by the common drive means for the two conveyor systems. Considerable simplification of the entire construction therefore results.

In an advantageous form of construction of the first displaceable clamping device, this consists of a horizontal U-shaped component which is open at the front and the limbs of which straddle the film material, there being fitted in the lower limb a controlled hydraulic or pneumatic piston-and-cylinder unit which presses a plunger for clamping the film material against the upper limb. In this arrangement the U-shaped component is displaceable on guide rods between the horizontal arms of the supporting element, and there is provided in each of the arms a hydraulic or pneumatic piston-and-cylinder unit which effects displacement of the clamping device relatively to the supporting element, this relative displacement being limited by adjustable stops, which are arranged concentrically on the guide rods, extend through the lower limb of the U-shaped component and are interconnected by means of a cross-piece, and the extent of the relative movement being adjustable through a set-screw which is provided in the cross-piece and abuts the cover of the cylinder of the hydraulic or pneumatic piston-and-cylinder unit.

In order to be able to heat the film material between the two conveyor systems over a narrow band extending over the entire width of the material and positioned outside those parts of the film material to be heated for processing purposes, the contact-heating device for heating the film material for processing purposes is provided with heating strips, one disposed at the front end of its upper heating plate and the other at the front end of its lower heating plate, which heating strips are positioned at a distance from those parts of the film material to be heated for processing purposes and extend over the entire width of the film material and, upon closing of the contact heating device and when the upper and lower heating plates bear on the film material, heat a narrow band of this material so that stretching occurs only in the zone of this heated band, whereas the parts of the film material that are to be heated for processing purposes are not affected by this stretching action.

Figure 2:
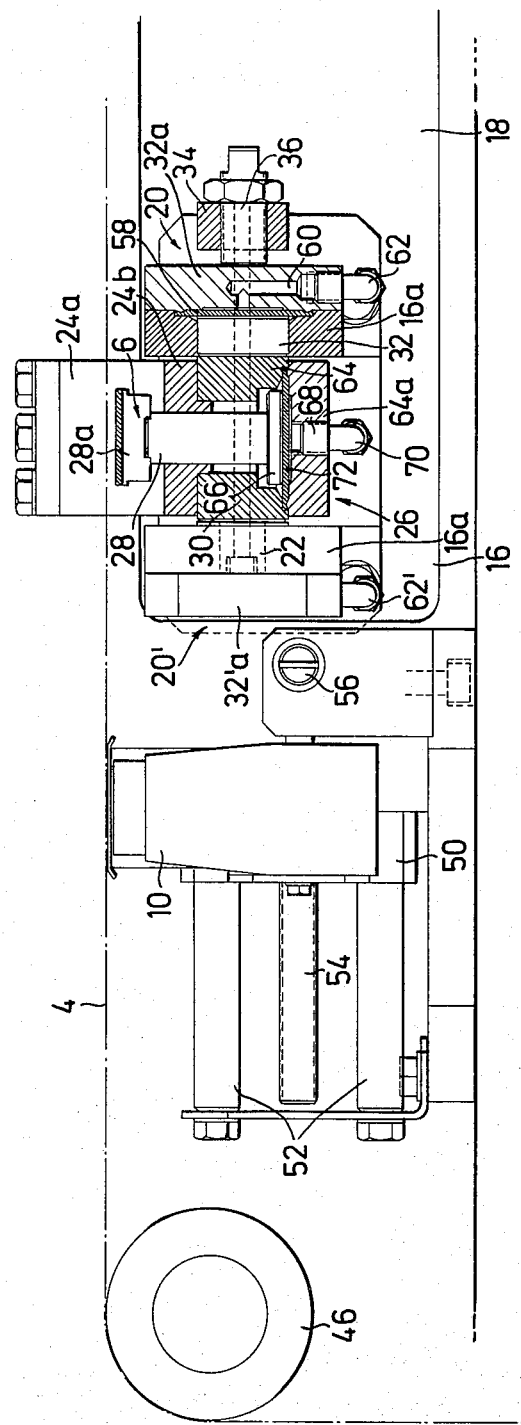

The invention will now be described in greater detail by reference to an embodiment illustrated in the drawings, in which:

FIG. 1 is a diagrammatic illustration of the apparatus of the invention, and will also be used for explaining the method of the invention, FIG. 2 is a detail drawing, partly in section, of the device for probing the printed pictures and of the first conveyor system, and FIG. 3 is a plan view of part of the film material indicating the area where heating takes place.

FIG. 1 shows part of a machine of known design for forming, filling and closing containers made of plastics material. At a shaping station 44 the machine forms containers from the film material 4 heated in a heating device 38, and the containers are further processed in the following stations not illustrated in the drawing, i.e. they are filled at a filling station, then sealed, by a closing mechanism, with film drawn from a roll and are separated from the web of film by a parting-off device. In mechines of this kind it is necessary, particularly when closing and parting off the containers, to ensure that the containers are very accurately positioned in the tools so that the resultant edge is symmetrically or concentrically disposed in relation to the lower part of each container and so that, in particular, the film material 4, carrying an initially distorted printed picture, passes through the machine in exactly the required position. As can be seen from FIG. 1, the film material is on a supply roll 2 and is drawn therefrom over a guide roller 46 and brought into the plane along which it is to pass through the machine. The example illustrated is that of an intermittently operating machine in which the film material 4 is passed through the machine in synchronism with the working strokes of the devices constituting the machine. For this purpose there are provided two conveyor systems 6 and 8, the first of which is disposed upstream of the heated zone of the film material 4 in the direction of feed, and the second downstream of said heated zone, at the end of the machine and upstream or downstream of the stamping tool. The two conveyor systems 6 and 8 are interconnected by means of the thrust rod 42 which extends over the entire length of the machine and is engaged by the drive means 18. The conveyor systems 6 and 8 comprise clamping devices 12 and 14 which seize and clamp the film material at the commencement of the feed stroke and move it forwards by one step of specific length whereas upon completion of the feed stroke they release the film material and return to their initial positions. The device 10, in the form of a photo-electric cell, for probing the printed pictures is used for effecting automatic centering of the printed pictures. For this purpose the probing device 10 is mounted on a holder 50 which is mounted for longitudinal displacement on the guide rods 52.

For the purpose of adjusting the position of the probing device 10, a screw-threaded spindle 54 is turned by means of a crank-handle which can be fitted on the shaft 56, so that the device 10 for probing the printed pictures can be correspondingly displaced in the longitudinal direction.

As already mentioned, the device 10 probes marks printed on the film material 4 which occur at slightly shorter distances apart as compared with the corresponding distances of the marks on the finished film material, the probing device 10 being so positioned in relation to the conveyor systems 6 and 8 that it responds to a mark when a predetermined deviation of the mark with respect to the feed step of the machine occurs. A controllable actuating element 20 of the first conveyor system 6 is then operated in such manner that the clamping device 12 executes a controlled rearward movement after completion of the feed movement and when the film material 4 is stopped, the distance over which said return movement takes place being constant. In this way the film material 4 between the clamping devices 12 and 14 is stretched and the deviation is offset.

The clamping device 12 of the conveyor system 6 is carried between the parallel arms 16a of the supporting element 16 and consists of a horizontal U-shaped component 24 which is open at the front and the upper limb 24a of which extends above the film material 4, whilst its lower limb 24b lies below the film material. Fitted in the lower limb 24b is a hydraulic or pneumatic piston-and-cylinder unit 26, in the cylinder 64 of which there slides a plunger 28 which is displaced by the piston 66. The cylinder 64 is closed by a cover 64a which also clamps a diaphragm 72. The plunger 28 acts on a pressure plate 28a which, when the hydraulic or pneumatic piston-and-cylinder unit 26 is actuated, is pressed against the upper limb 24a of the U-shaped component 24 and thus clamps the film material 4. The controlled admission of pressure medium is by way of a pipe 68 and a union 70 to which is fitted a hose and from which runs the pressure-medium line for actuating the machine, which line is disposed in the casing 48.

Fitted in one of the arms 18a of the supporting element 16 is the controllable actuating element 20 which likewise consists of a hydraulic or pneumatic piston-and-cylinder unit and is constructed similarly to the hydraulic or pneumatic piston-and-cylinder unit for the clamping device 12, which latter unit is fitted in the lower limb 24b. The actuating element 20 comprises a resilient diaphragm 58 which is pressed against a bore in each of the arms 16a by the cover 32a of the cylinder and abuts against the piston 32. The pressurized medium is passed to the rear of the diaphragm 58 through the bore 60 and the union 62 to which a flexible hose is connected. The piston 32 presses on to the cylinder 64 of the hydraulic or pneumatic piston-and-cylinder unit 26 connected to the lower limb 24b and in this way displaces the clamping device 12 relatively to the clamping device 14. For this purpose the U-shaped component 24 is guided on guide rods 30 which extend on both sides of the cylinder 64 and which each have a stop 22 at one of their ends and are interconnected at their other ends by the cross-piece 34 which bears against the cylinder cover 32a by way of a set-screw 36.

The controllable actuating element 20 is used for imparting a backward movement to the clamping device 12. A similar controllable actuating element 20', only the cylinder cover 32'a and the union 62' of which are illustrated, is disposed in the opposite arm 16a of the supporting element 16 in order to return the clamping device 12 to its initial position after the rearward movement for stretching the film material has taken place.

In order to limit stretching of the film material 4 to a narrow band 4a and, in particular, to prevent those parts 4b, heated for processing purposes, from being affected by the stretching action, heating strips 40 are fitted one on the upper and one on the lower heating plate 38a and 38b respectively, which strips extend over the entire width of the film material and heat this over corresponding bands when the upper and lower heating plates 38a and 38b are pressed against the upper and lower faces respectively of the film material 4.

The mode of operation of the apparatus of the invention is as follows: as long as the device 10 for probing the printed pictures is unable to detect any appreciable deviation of the printed picture from the position it is required to occupy when the material is advanced by the machine, the film material 4 is moved through the machine in phase and over the same distance by means of the clamping devices 12 and 14 during each stroke, and during each stop the film material 4 is heated in the heating device 38, is shaped in the forming station 44 and is further processed in the following stations. As this occurs, the controllable actuating element 20', fitted in the left arm 16a on the supporting element 16, is loaded by the pressure of the pressurized medium and moves the lower limb 24b of the U-shaped component 24 into contact with the right arm 16a of the supporting elememt 16. Since the film material is printed with pictures at somewhat smaller distances apart than those occurring on the finally processed material, there of necessity occurs, after a number of working strokes of the machine, deviation of the printed picture as compared with the feed step, and this deviation is detected by the device for probing the printed pictures when it reaches a predetermined amount, whereupon the probing device 10 causes pressure to be cut off from the controllable actuating element 20' and to be applied to the controllable actuating element 20. This causes the lower limb 24b of the U-shaped component 24 to be moved against the adjustable stops 22 and the film material 4 to be stretched, and the stretching in fact occurs only in the heated band 4a since the unheated parts of the film material 4 offer considerably greater resistance to stretching than this heated band 4a. The heated band 4a is disposed slightly upstream of the part 4b, heated for processing purposes, said band being preferably so positioned that it moves into the unheated band between two consecutive parts 4b heated for processing purposes, when the film material 4 has been advanced a step.

The means for controlling the machine are so designed that the rearward movement for stretching the film material 4 is carried out after completion of the feed movement and when the film material 4 is stopped. The rearward movement may however also take place after the clamping devices 12 and 14 have returned to their initial positions.

The stretching brings the first printed picture nearest to and upstream of the processing stations into the correct position in relation to the feed, so that further correction is only required after several working strokes of the machine, when a corresponding deflection has occurred.

It might be mentioned at this point that the invention is not limited to the embodiment described since it is possible for the clamping device 14 to be displaceable instead of the clamping device 12 in order to use it for stretching the film material 4 between the two devices. Also, the clamping devices 12 and 14 can be replaced by conveyor rollers which are mechanically coupled to each other and always turn at the same speed, the shafts of the upstream and downstream conveyor rollers being adapted to be displaced in a controlled manner by means of a device for probing the printed pictures, in order to effect stretching of the film material.

All the details and features disclosed herein, particularly the spatial arrangement and construction of the apparatus, are claimed as being important to the invention as far as, singly or in combination, they do not form part of the prior art.

What is claimed is:

1. In a packaging process comprising intermittently feeding a web of thermoplastic film having spaced, repeat indicia formed thereon, whereby said film web is formed in a container forming stage, the container is filled in a container filling stage and the container is closed in a container closing stage, an improved method of compensating for predetermined deviations of said indicia, said method comprising the steps of:
   a. detecting said predetermined deviation with probe means;
   b. clamping said film web on either side of a container forming station between two horizontally spaced apart clamping members when the web is stopped; and
   c. longitudinally displacing one of said clamping members with respect to the other, thereby stretching the film web by a predetermined amount to compensate for the predetermined deviation detected by said probe means.

2. The method of claim 1 including the further step of heating a narrow transverse band of said film web prior to longitudinally displacing said clamping member whereby stretching of the film occurs only across the heated band.

3. In a packaging apparatus comprising a container forming station, a container filling station and a container closing station, having feed means for intermittently advancing on a timed basis a web of thermoplastic film through said stations, said film having spaced repeat indicia printed thereon, probe means for detecting a predetermined amount of deviation of said indicia, and improved means for centering said indicia when the indicia has deviated by said predetermined amount, said improvement comprising:
   a first clamping means and associated support element, said first clamping means being mounted for longitudinal displacement along said support element, a second clamping means and associated support element, said second clamping means being fixably mounted to its support element, one of said clamping means being located upstream of said container forming station and the other of said clamping means being located downstream of said container forming station, and including means controlled by said probe means for simultaneously actuating both of said clamping means to clamp said thermoplastic film therebetween and means controlled by said probe for displacing said first clamping means longitudinally of said second clamping means when the film is stopped, thereby stretching the film by a predetermined distance to compensate for the predetermined deviation detected by said probe means thereby centering the indicia.

4. The improvement of claim 3 wherein each of said clamping means comprises a horizontally disposed U-shaped component, the upper limb of said component extending transversely of and above the film web, the lower limb of said component extending transversely of and below the film web, a pneumatically or hydraulically operable piston and associated plunger vertically disposed in said lower limb and a thrust rod interconnecting the clamping means whereby upon detection by said probe means of said predetermined amount of deviation said plungers are simultaneously displaced vertically upward thereby clamping the film between the plunger and the upper limb of the U-shaped component.

5. The improvement of claim 4 further including a pressure plate disposed between the plunger and the film web.

6. The improvement of claim 3 wherein said probe means is a photo-electric cell.

7. The improvement of claim 3 wherein the means for longitudinally displacing the first clamping means comprises a horizontally disposed piston and cylinder means located on each end of the support element, one of said piston and cylinder means displacing the clamping means to effect stretching of the film upon detection by said probe means of said predetermined amount of deviation and the other of said piston and cylinder means returning the clamping means to its rest position when the film has been stretched by the predetermined amount.

8. The improvement of claim 3 further including heating means located between the forming means and the first clamping means and disposed transversely of the film web, whereby a narrow transverse band of the film web is heated, stretching of the film occurring only across said heated band.

* * * * *